Nov. 22, 1960

C. W. GARDINER 2,961,644

DATA TRANSLATING APPARATUS

Filed Jan. 28, 1957

INVENTOR
CHARLES W. GARDINER

BY Fred Jacob
ATTORNEY

Nov. 22, 1960    C. W. GARDINER    2,961,644
DATA TRANSLATING APPARATUS
Filed Jan. 28, 1957                                6 Sheets-Sheet 5

INVENTOR
CHARLES W. GARDINER
BY Fred Jacob
ATTORNEY

Nov. 22, 1960

C. W. GARDINER 2,961,644

DATA TRANSLATING APPARATUS

Filed Jan. 28, 1957

*INVENTOR*
CHARLES W. GARDINER
BY Fred Jacob
*ATTORNEY*

United States Patent Office 2,961,644
Patented Nov. 22, 1960

2,961,644

DATA TRANSLATING APPARATUS

Charles W. Gardiner, Manchester, Mass., assignor, by mesne assignments, to Laboratory For Electronics, Inc., Boston, Mass., a corporation of Delaware Filed Jan. 28, 1957, Ser. No. 636,763

19 Claims. (Cl. 340—174)

The present invention relates to translating apparatus for converting each unit of data which is to be transferred between a first and a second domain of a data processing system into a form acceptable to the addressed domain. More specifically, the computer of a binary digital data processing system, particularly the arithmetic unit thereof, may require the data to be in a particular form in order to operate upon it. The latter form is often different from that required at the system output, for example, at the typewriter output. In the instant data processing system all computations performed by the arithmetic unit require the particular data unit, e.g. the data word being operated upon, to be in its unpunctuated form. On the other hand, data at the typewriter output is obviously required to be in punctuated form in order to be readily intelligible. The translating apparatus which forms the subject matter of the instant invention is capable of punctuating the data prior to its transfer to the output, i.e. the second domain, or of depunctuating the data received from the output which is addressed to the computer, or first domain. The term "punctuation," as herein employed, applies to the insertion of punctuation symbols such as commas, colons, periods, etc., as well as the change of certain data characters, e.g. the change of a 0 to a space. The term further includes the insertion of such symbols as dollar signs or British pound signs, as well as any other symbol or letter which may be required in a particular data unit as it is finally typed by the output typewriter. Additionally, the above-named operations may occur conditionally or unconditionally, i.e. they may depend on the nature of the data. Combinations of the above-named operations, on a conditional or on an unconditional basis, are also included in the meaning of the term. The term "depunctuation" applies to the reversal of the changes brought about by the punctuation operation in order to make the particular data unit again acceptable to the first domain.

In the instant data processing system, the direction of data flow in the first domain occurs in the direction of least significant digit first (least first), it being convenient to let the arithmetic unit operate on a data unit in this manner. Data flow in the second domain occurs in the direction of most significant digit first (most first) which represents normal typewriter operation. It is an additional function of the translating apparatus which forms the subject matter of the present invention to conform the direction of data flow to the requirements of the addressed domain.

In present day binary digital data processing systems such punctuation and depunctuation operations are generally carried out by means of programming. Since one instruction is required for the insertion or deletion of each punctuation symbol, this becomes a time-consuming and expensive procedure. For example, the insertion of a punctuation symbol such as a comma requires the interruption of data flow from the computer, the continued data flow in the output domain in order to create a space, the insertion of the punctuation symbol into the space so created and the subsequent resumption of data flow from the computer. Changes of data characters, insertions and deletions on a conditional or unconditional basis are correspondingly more complicated.

The present invention provides simple and economical apparatus for instrumenting the foregoing steps to provide automatic operation so that only one instruction per data unit is required. In brief, a reversing register is provided for receiving respective data units addressed to the second domain and to reverse their direction of flow. A punctuation register, which contains the punctuation format that is applicable to the punctuation of the particular data unit contained in the reversing register cooperates with the latter. A shift control circuit coordinates both the direction and the amount of shift of both registers so that the proper punctuation will be applied as the data unit flows forth from the most first output of the reversing register. The instant embodiment utilizes a punctuator which is responsive to the output signal of the punctuation register to perform the actual punctuation of the data unit prior to its transfer to the second domain. The format contained in the punctuation register is recirculated around the register so as to be available for all data units of the same type which enters the reversing register from the first domain. Additionally, for the purpose of depunctuating data units addressed to the first domain, a depunctuator is provided intermediate the second domain and the reversing register, the latter again reversing the direction of data flow.

Accordingly, it is a primary object of this invention to provide translating apparatus for converting data units which are to be transferred between respective first and second domains of a data processing system into a form acceptable to the addressed domain.

It is another object of this invention to provide translating apparatus intermediate the computer domain and the output domain of a data processing system for punctuating data units which are to be transferred from the first of said domains to the latter domain.

It is a further object of this invention to provide translating apparatus intermediate the computer domain and the output domain of a data processing system for depunctuating data units contained in the output domain which are addressed to the computer domain.

It is an additional object of this invention to provide translating apparatus intermediate the computer domain and the output domain of a binary digital data processing system for inserting or deleting punctuation symbols, changing data characters, and combinations of the aforesaid operations, conditionally or unconditionally.

It is still another object of this invention to provide translating apparatus intermediate two distinct domains of a binary digital data processing system for changing the direction of data flow from at least first to most first, or vice versa, according to the requirements of the addressed domain.

These and other objects of the invention, together with further advantages thereof, will become more apparent from the following detailed specification with reference to the accompanying drawings, in which:

Fig. 6 illustrates the shift control circuit which coordinates the operation of the diverse units of Fig. 1.

Figure 1:
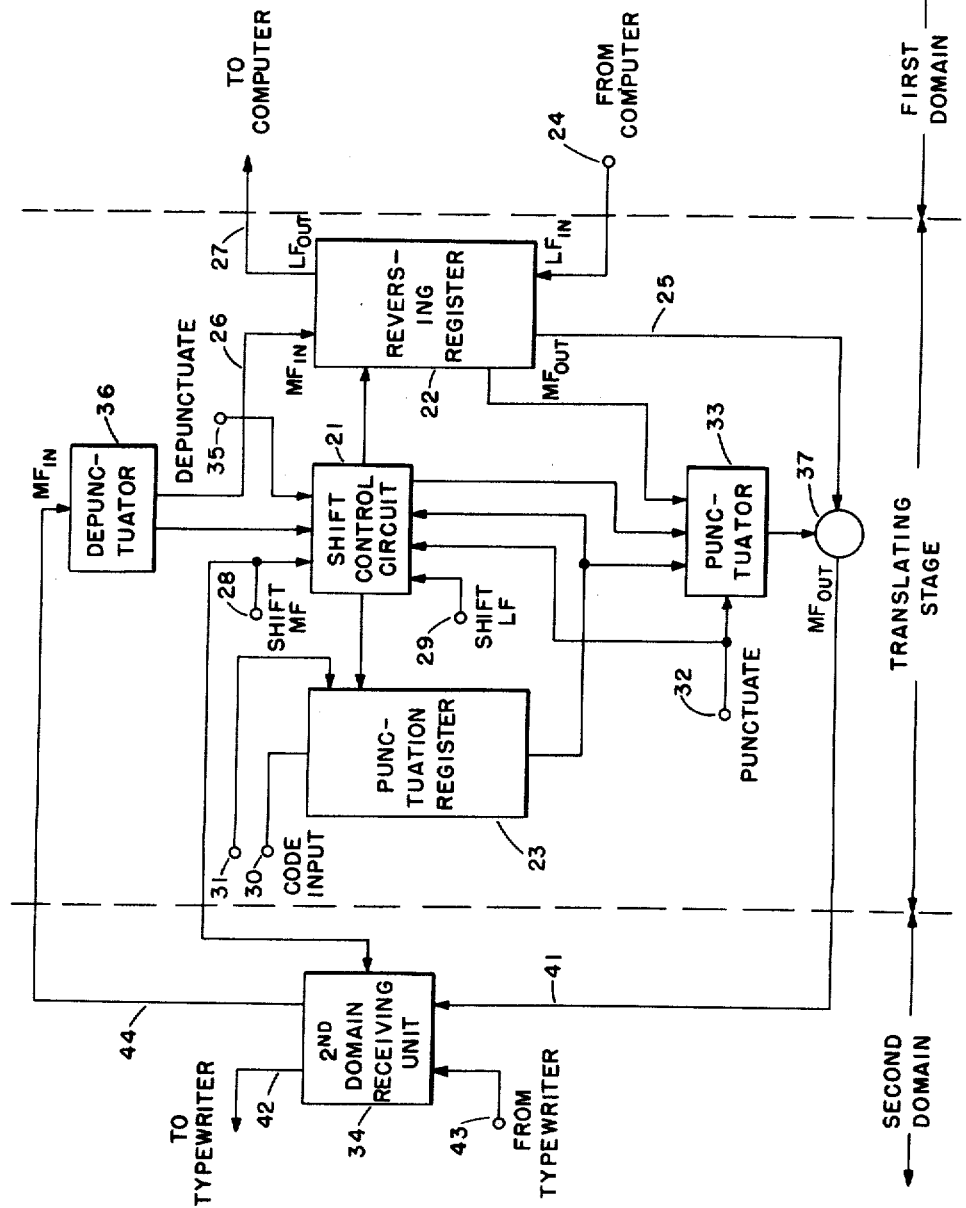
Fig. 1 is a schematic representation of the translating apparatus of the present invention.

Fig. 1 is a schematic representation of the translating apparatus of the present invention. As shown, a shift control circuit 21 coordinates the operation of a reversing register 22 and a punctuation register 23. Each data unit, e.g. each data word, consists of individual data characters represented in binary digital form which are received by the reversing register in the least first direction from a source 24 in the first domain. The operation of the reversing register is such, that after all the data characters of a particular data unit have entered the register from source 24, the flow of data within the register is reversed and the data unit appears in the most first direction at output 25 of the register. Prior to the entry of the aforesaid data unit into the reversing register, the punctuation format, which consists of individual punctuation codes, is entered into the punctuation register from a code input source 30. The latter operation may be programmed so that the punctuation format entered corresponds to the type of the particular data unit which is to be punctuated. The shift signal which actuates the punctuation register in order to enter the aforesaid punctuation code is obtained from a source 31. The punctuation register contains a recirculation path so that the same format may be used over again to punctuate all successive data units of a given class. The shift control circuit maintains a fixed relationship between individual punctuation codes in the punctuation register and respective data characters in the reversing register relative to the output end of each register. A punctuator 33, which acts as a code converter between the punctuation register and the second domain, is responsive to the signals produced by the punctuation codes in register 23, as they reach the output end. The punctuator is additionally controlled by signals derived from shift control circuit 21 and from the reversing register, respectively. The output signals of the punctuator, together with the most first output signals derived from output 25 of the reversing register, are buffered to input 41 of a second domain receiving unit 34 by buffer 37. The second domain receiving unit may comprise any storage device capable of receiving a continuous flow of information. Thus, it may consist of a shift register or of another magnetic storage medium, the only requirement being that its input end 41 be cleared continuously in order to make room for the next arriving data character or punctuation symbol. Output 42 of the receiving unit is connected to the actual output device of the data processing system, e.g. a typewriter. For depunctuation purposes, an input 43 is provided which connects the typewriter to the second domain receiving unit. Information so received in the most first direction is transferred out in the same way via output 44, whence it is fed to depunctuator 36 in the translating apparatus. The depunctuator, in cooperation with the shift control circuit, changes the punctuation of any arriving data unit back to the way in which it was received from the first domain. Thereafter, the particular data unit enters the reversing register via input 26 and is reversed therein. It leaves the register in the least first direction via output 27 and is subsequently transferred to the first domain. The shift control circuit is governed by shift least first or shift most first signals derived from terminals 29 and 28 respectively, the latter source additionally controlling the operation of the second domain receiving unit. Furthermore, output signals derived from the punctuation register and from depunctuator 36 govern the operation of the shift control circuit. If it is desired to punctuate a data unit addressed to the second domain by means of a corresponding punctuation format contained in the punctuation register, a shift least first signal is applied by source 29 to enter the data unit into the reversing register from the first domain. Thereafter, a shift most first signal is applied by source 28 while a "punctuate" signal, derived from source 32, is applied to the shift control circuit as well as to the punctuator. Information flow in both registers will then proceed in a most first direction, the data from the reversing register being received at the most first output 25, while the individual punctuation codes which constitute the punctuation format contained in the punctuation register will appear at the output of the latter, as well as being recirculated thereacross. If a code appears at the output register 23 which calls for the insertion of a punctuation symbol, the shift control circuit is actuated to arrest the flow of information in both registers. Since the data characters in the second domain receiving unit continue to move away from the input end under the controlling action of the shift most first signal derived from source 28, a space is created. Simultaneously, the punctuator responds to the punctuation code then appearing at the output of the punctuation register to insert the required punctuation symbol into the aforesaid space. The signal derived from the reversing register which is applied to the punctuator, as shown in Fig. 1, has the effect of making the operation of the latter conditional upon the particular data character which is then at the output of the reversing register. Thus, the punctuation code may provide for changing a 0 to a space. Accordingly, the action of the punctuator will be dependent upon the arrival of a 0 at the output of the reversing register.

Depunctuation proceeds upon the application of a "depunctuate" signal from source 35 and a shift most first signal from source 28. In this case, the changes brought about by the punctuation process are reversed in order to restore the data unit to the form in which it was originally received from the computer. To this end, the depunctuator rejects certain punctuation symbols while the reversing register continues to shift, thereby changing the rejected symbols to 0's. Alternatively, the symbols may be suppressed entirely. In the latter case, the depunctuator actuates the shift control circuit which in turn arrests the shifting operation of the reversing register to prevent the entry of the particular punctuation symbol. After the depunctuated data unit has completely entered the reversing register in a most first direction, a shift least first signal is applied from source 29 to shift the data unit out of the register into the first domain.

As explained above, all data are organized into data units, each data unit consisting of individual data characters.

Respective data characters are written in binary digital code, each binary digit or bit being represented by one of two possible states of magnetization of a magnetic core. The arrangement employed is such that the respective data characters of a data unit are serially arranged, while the bits which represent a single data character appear in parallel. Specifically, the cores containing the bits which constitute a single data character are arranged in parallel, while a given data unit is represented by the magnetization of a number of the aforesaid parallel core configurations arranged in series.

Figure 2:
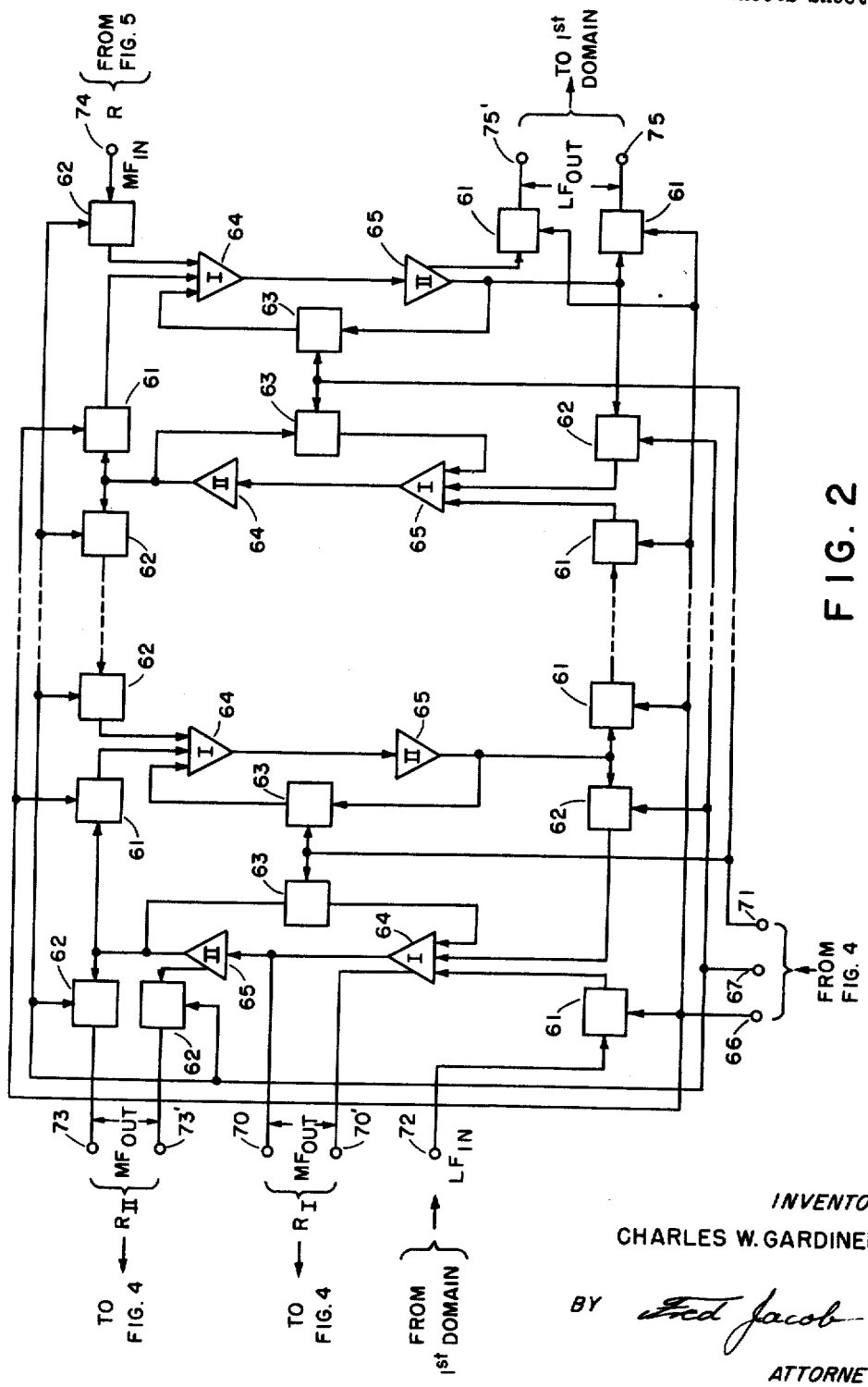
Fig. 2 illustrates the reversing register shown in Fig. 1.

Fig. 2 shows a reversing register which may be used in the translating apparatus of the present invention. The register is of the type described in detail in a co-pending application of Robert R. Evans, entitled "Directional Data Transfer Apparatus," Serial No. 616,722, filed October 18, 1956. It consists of "and" gates represented by squares in the drawing of Fig. 2, "or" gates or buffers represented by one or more arrows entering a circuit element, and magnetic amplifiers represented by triangles. Since the register of Fig. 2 represents a duo-directional path for one bit only, the number of registers which must be connected in parallel is equal to the number of bits used to represent a single data character. In one embodiment of the invention, each data character is represented by four bits plus a parity check bit. In the convention employed, the reversing register has the address "R" and hence, all data derived therefrom as well as selected data addressed thereto are denoted accordingly. The respective output signals derived from the aforesaid registers which are connected in parallel follow the binary digital code notation as follows: $R_8$, $R_4$, $R_2$, $R_1$ and $R_P$, the latter being the parity check bit. In logical computer operations such as are carried out by the present circuit, it is frequently convenient to use a logically inverted output signal, in addition to the direct output signal. Such signal inversion may be carried out in the manner described in greater detail in a co-pending application of Robert C. Kelner et al. entitled "Magnetic Amplifiers," Serial No. 613,705, filed October 3, 1956. The convention adopted in the drawings to indicate signal inversion consists of a line emanating from the side of the triangle which represents a magnetic amplifier. The inverted signals as well as the terminals on which they appear are denoted by prime numbers of letters, e.g. $R_8'$. Only a single data unit, e.g. a data word, is admitted to the reversing register at a given time. Accordingly, the register must be large enough to admit all the serially arranged data characters of the data unit. The broken lines in the drawing indicate that the register may have any desired size. In the register, the temporary storage of a bit occurs in the cores of magnetic amplifiers 64 and 65 which together constitute a data storage unit. The latter are alternately pulsed at half bit time intervals as shown by Roman numerals I and II to pass on the bit stored therein to the succeeding amplifier. Depending on the timing required in the connected piece of equipment, data may be derived from the output of an I amplifier 64 or a II amplifier 65, as shown at terminals 70 and 73 respectively. The signals so derived are appropriately labeled $R_I$ and $R_{II}$ respectively. A first set of gates 61 permits data transfer in the least first direction upon the application of a signal to terminal 66. Accordingly, data characters entering via least first input terminal 72 are transferred across the register. If data transfer in the most first direction is desired, a signal is applied to terminal 67 while the signal on terminal 66 is discontinued. In that case, gates 61 close and gates 62 open to shift data in the opposite direction. While operating the register in the latter manner, data may be received at the most first input terminal 74. If it is desired to bring about a reversal in the direction of flow of a particular data unit which is being received from the first domain, pulses are applied to terminal 66 until all of the data characters have entered the register. At that point the signal is discontinued and pulses are applied to terminal 67. Upon receipt of the latter pulses, the data begin to shift in the opposite direction and leave the register in the most first direction via terminals 70 and 73. Alternatively, data may be entered in the most first direction via terminal 74 in order to have their direction of flow reversed and to be transferred out of the register by way of least first output terminals 75. If it is desired to arrest the flow of data across the register, a signal is applied to terminal 71, while the signals applied to terminals 66 and 67 are discontinued. Gates 63 open to provide a local circulation path within each data storage unit, all other gates remaining closed. Thus, a bit contained within a data storage unit is shifted from amplifier 64 to amplifier 65 and back to the input of amplifier 64, thereby becoming available at bit period intervals at the output of the particular data storage unit without advancing in the register.

Figure 3:
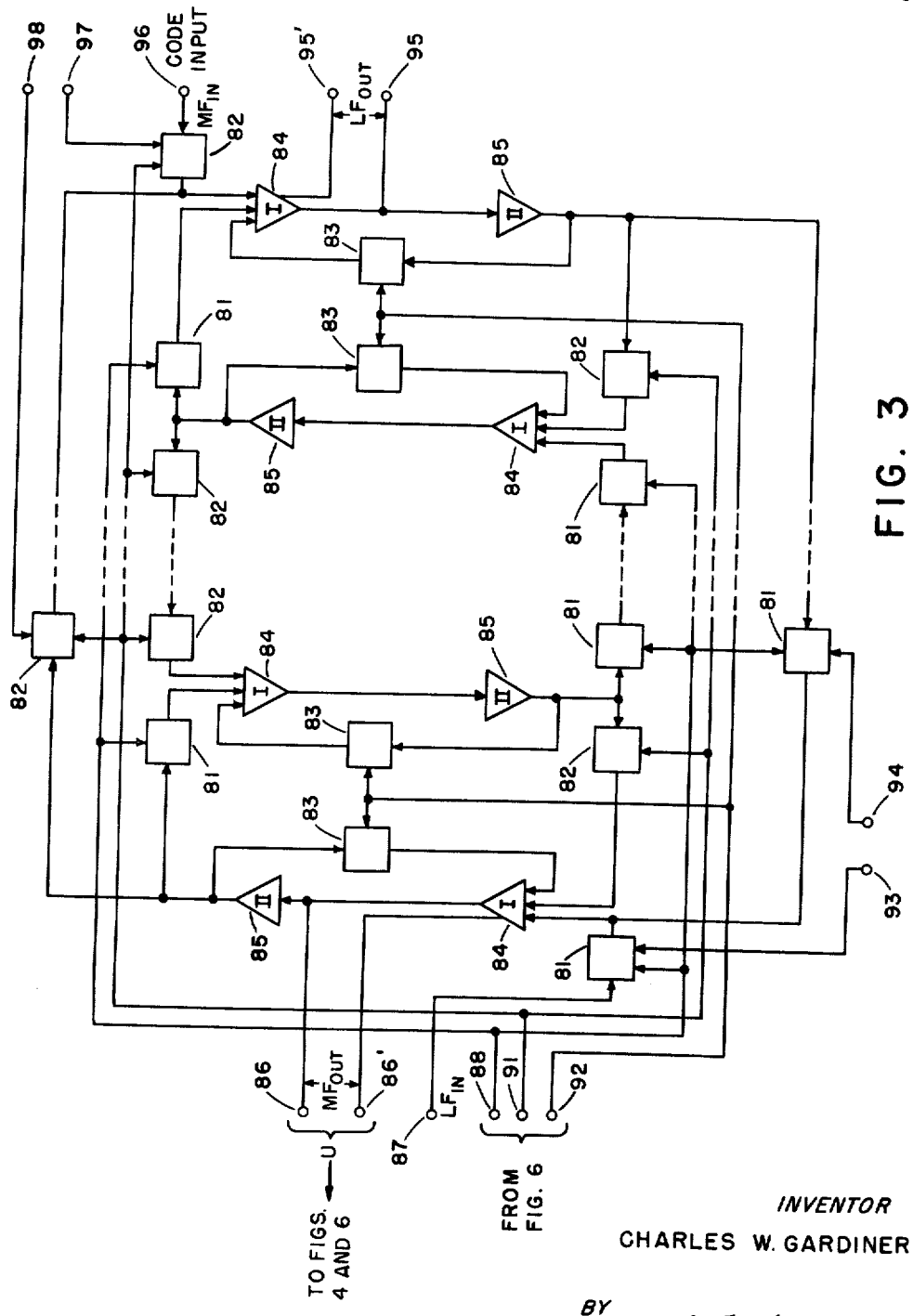
Fig. 3 illustrates the punctuation register shown in Fig. 1 which contains the punctuation format.

The punctuation register illustrated in Fig. 3 is similar to the reversing register of Fig. 2, but additionally comprises paths for recirculating the punctuation codes in a least first or a most first direction around the register. As in the case of the reversing register, the broken lines indicate that the punctuation register may have any size necessary to accommodate all of the punctuation codes of a given punctuation format. Similarly, the number of duo-directional paths of the type shown in Fig. 3, which are connected in parallel is determined by the number of bits necessary to represent each punctuation code. In the convention employed herein, the punctuation register has the address "U" and each punctuation code is represented by three bits plus a parity check bit, i.e. $U_4$, $U_2$, $U_1$ and $U_P$, the inverted output signals again being denoted by prime symbols. While the register illustrated in Fig. 3 shows two inputs and two outputs as in the case of the reversing register, only a single input and a single output is required in most instances. When a first set of gates 82, which includes a recirculation gate, is actuated by a signal applied to terminal 91, a punctuation format is entered via most first input terminal 96 and is shifted across the punctuation register. While the respective punctuation codes which make up the punctuation format are entering the register, the input gate of the set remains open due to the application of a signal to terminal 97. After all the codes of the format have entered the register, the latter signal is discontinued and a signal is applied to terminal 98 to open the recirculation gate of the set. As long as the signal applied to terminal 91 is maintained, the codes of the punctuation format, upon reaching MF output terminals 86, are also recirculated around the register in the most first direction. For reasons of timing which will become evident hereafter, the most first output signal "U" is derived intermediate amplifiers 84 and 85 of the output storage unit, one-half bit period before the punctuation code in the register is recirculated. The direct output signal then becomes available at terminal 86, while the inverted output signal appears at terminal 86'. If recirculation in the least first direction is desired, a signal is applied to terminal 88 to open a second set of gates 81, while the signal on terminal 91 is discontinued. Additionally a signal is applied to terminal 94 to open the recirculation gate of the second set. As above, the least first output signal is derived one-half bit period before the punctuation code in the register is recirculated, said output signal becoming available at terminals 95 and 95'. If desired, a punctuation format may also be entered into the register via terminal 87 by the application of a signal to terminal 93. It will be understood that the same signal may be applied to terminals 94 and 98, while the inverse of that signal may be applied to both of terminals 93 and 97. As in the case of the reversing register, the transfer of information across the register may be arrested by the application of a signal to terminal 92, the signals applied to terminals 88 and 91 respectively, being discontinued.

As explained above, the number of registers of the type shown in Fig. 3 which must be connected in parallel, will depend on the number of bits used to represent each punctuation code. The latter, in turn, depends on the total number of punctuation codes in use. For example, if eight individual punctuation codes are sufficient to make up the desired punctuation format, a three bit code may be used. Additionally, a parity check bit is provided for each code in order to determine an error in the code. An example of eight different punctuation codes which are represented by three bits plus a parity check bit is given in the chart below under the heading "Punctuation Register Code":

| Digit | Punctuation Register Code | Effect | Punctuator Code |
| --- | --- | --- | --- |
| 0 | 0001 | Do nothing | 0000000 |
| 1 | 0010 | Change zero to space | 1111100 |
| 2 | 0100 | Change zero to oh and insert a slash (/) immediately thereafter. | 1001100 |
|   |      |                                                                  | 1011101 |
| 3 | 0111 | Change zero to oh and insert a space immediately thereafter. | 1001100 |
|   |      |                                                              | 1111100 |
| 4 | 1000 | Insert a period (.) | 1111001 |
| 5 | 1011 | Insert a comma (,) | 1111010 |
| 6 | 1101 | Insert a slash (/) | 1011101 |
| 7 | 1110 | Insert a space | 1111100 |

It should be noted that the "oh" indicated in the chart above refers to a non-suppressible zero, i.e. a significant zero which will ultimately appear in the record of the output typewriter.

Figure 4:
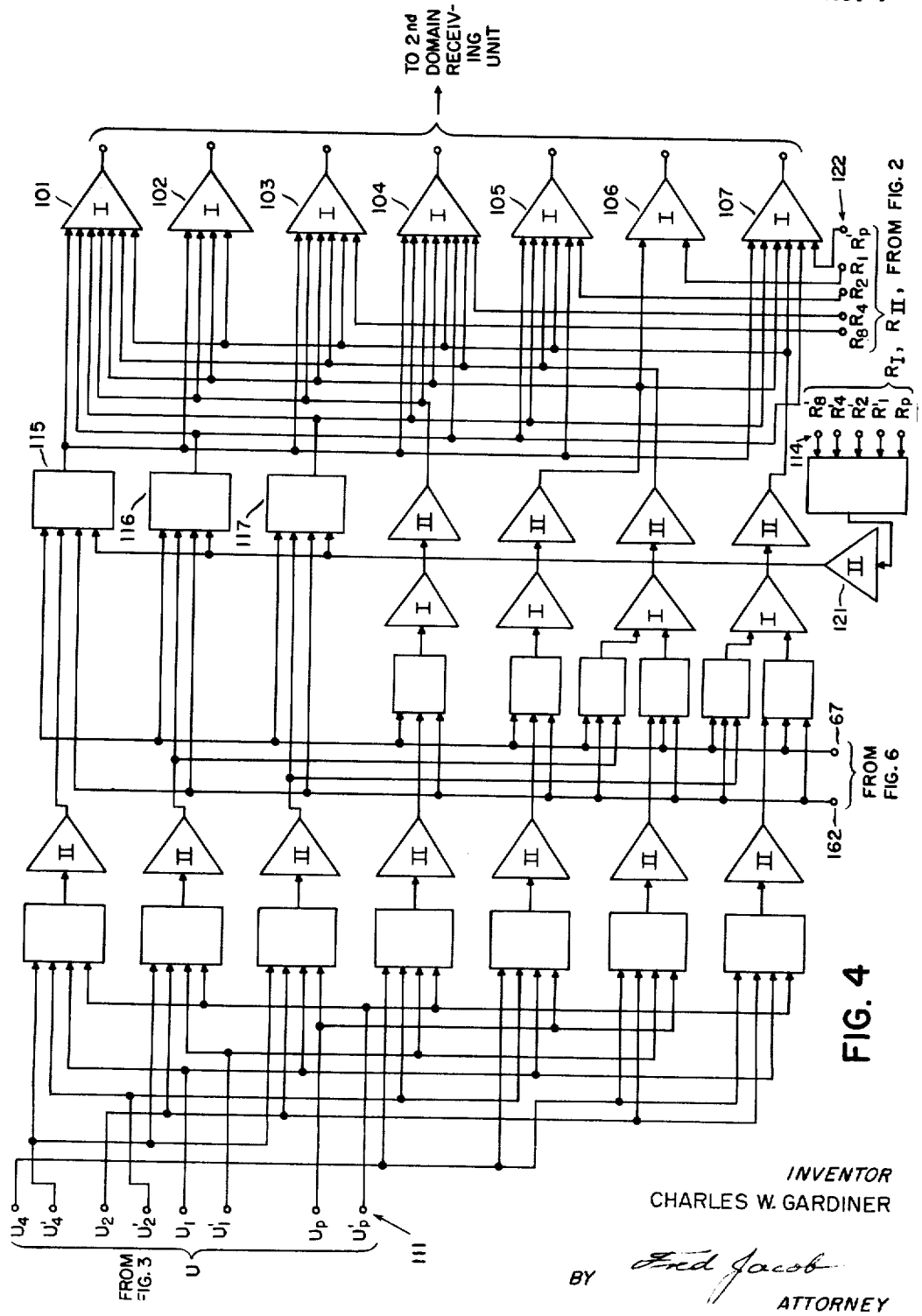
Fig. 4 illustrates one embodiment of the punctuator of Fig. 1.

The function of the punctuator illustrated in Fig. 4 is to convert the code derived from the output of the punctuation register into a code usable in the second domain, e.g. by the output typewriter, an example of the latter code being illustrated in the last column of the chart above. The logical circuit elements of the punctuator are like those employed in the registers and are indicated accordingly in Fig. 4. As in the case of Figs. 2 and 3, all No. I amplifiers are pulsed simultaneously in alternation with No. II amplifiers. The digits numbered 1 to 7 in Fig. 4 indicate the signal paths appropriate to the codes labeled 1 to 7 in the chart above. It will be noted that no signal path labeled "0" exists, the "do nothing" code requiring no action on the part of the punctuator. The direct output signals of amplifiers 101 through 106 represent the converted code, i.e. the punctuator code, while the inverted output signal of amplifier 107 comprises the parity check bit. In general, the punctuator performs changes, insertions, conditional operations, unconditional operations and any combination of the above operations. The output signals of the punctuation register, which are collectively designated as "U," are received at terminals 111. Additionally, a shift signal from the shift control circuit of Fig. 6 described below, is received at terminal 67 to coordinate the operation of the punctuator with that of the punctuation register and that of the reversing register. A "punctuate" signal is received at terminal 162, which signal is simultaneously applied to the shift control circuit of Fig. 6. The conditional operations denoted by digits 1, 2 and 3 in the chart above are carried out by means of gates 115, 116 and 117. The changes provided for in these operations are conditioned upon the occurrence of a 0 in signal $R_I$ derived from terminals 70 and 70' in Fig. 2. The $R_I$ signal is applied to terminals 114 of Fig. 4, respective parallel paths being labelled $R_8'$, $R_4'$, $R_2'$, $R_1'$, and $R_p$. The appearance of a signal on each of the inverted outputs is indicative of the absence of a signal on the corresponding direct outputs and, hence, it is indicative of a 0. The output signal of amplifier 121, in response to a 0, is then applied to gates 115, 116 and 117 to open the latter conditionally. Amplifiers 103, 104, 105, 106 and 107 are connected to terminals 122 which receive $R_8$, $R_4$, $R_2$, $R_1$ and $R_p'$ signals denoted as $R_{II}$ in Fig. 2. It will be noted that this comprises the most first signal output of the reversing register. Accordingly, the buffering function shown schematically in Fig. 1 as being performed by buffer 37, is performed directly in the punctuator of Fig. 4. As shown in the drawing, the output signals of amplifiers 101 through 107 are fed to the second domain receiving unit. In contradistinction to the $R_{II}$ signal which is derived from a No. II amplifier in the reversing register of Fig. 2, both the $R_I$ signal and the U signal are derived from No. I amplifiers in the circuits of Figs. 2 and 3 respectively. The reason for this arises from the fact that the latter signals are fed to No. II amplifiers at their respective destinations and must be timed accordingly.

Figure 5:
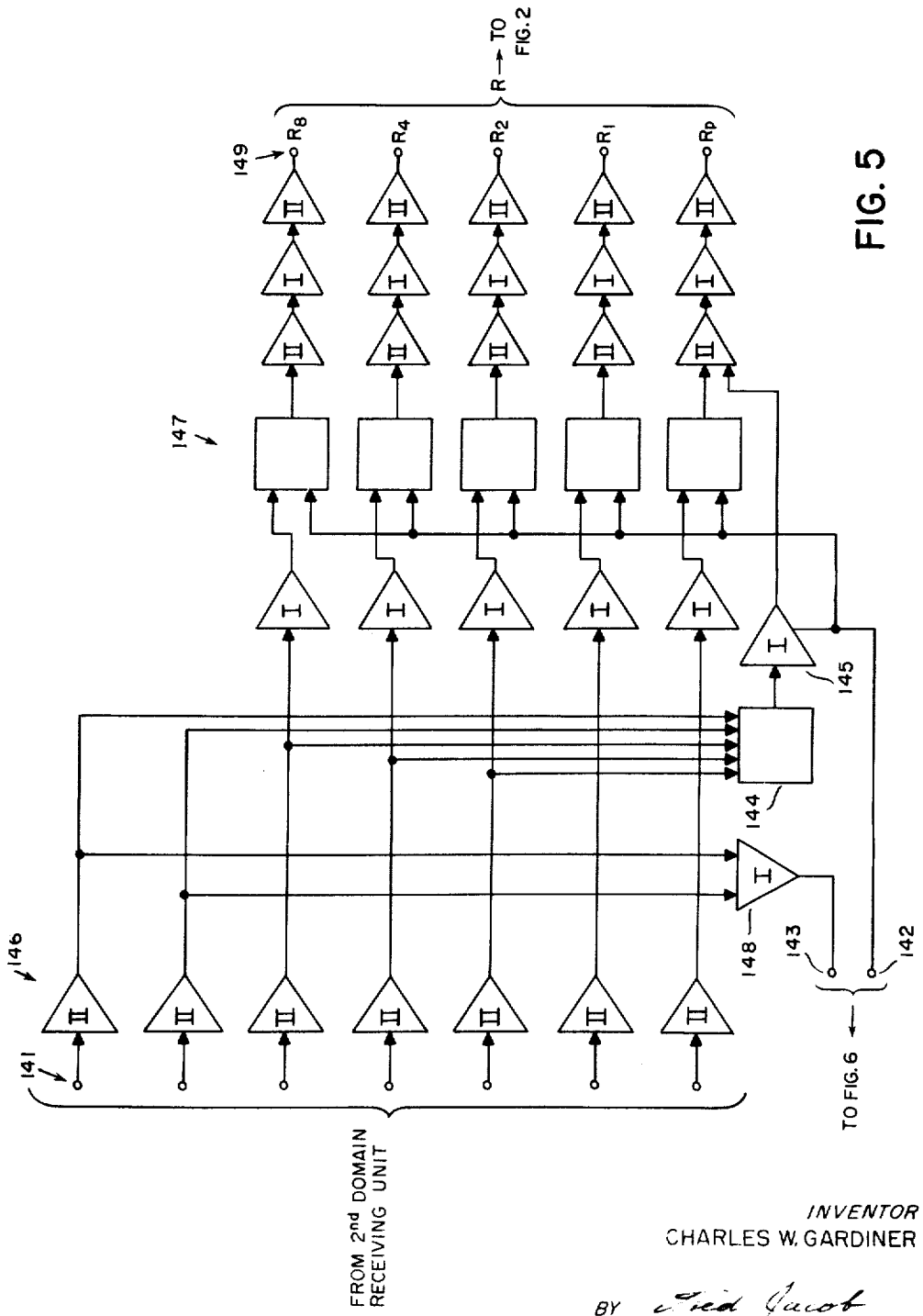
Fig. 5 illustrates one embodiment of the depunctuator of Fig. 1.

The function of the depunctuator shown in Fig. 5 is to reverse the changes in form of a data unit brought about by the action of the punctuator. Incidental thereto, the seven bit code signal received at terminal 141 from the second domain is converted to five bit code as required by the computer. The signal appears in its depunctuated form at output terminals 149 for further transfer to the most first input terminals 74 of the reversing register of Fig. 2. The five bit output signal of the depunctuator is appropriately labeled $R_8$, $R_4$, $R_2$, $R_1$ and $R_p$. Since depunctuation, like punctuation, may be a conditional operation, gate 144 is connected to the outputs of amplifiers 146 in such a manner that a pulse appearing at the inverted output of amplifier 145 indicates that the character under consideration is not a space. (See Punctuator Code in the chart above.) The occurrence of a space will cause gates 147 to close. Accordingly, the output signal at terminals 149 one and one-half bit periods later, will be the desired 0 which is transferred to the first domain. The direct output signal of amplifier 145 supplies a parity bit in this case. The inverted output signal of amplifier 145 is also applied to terminal 142 for further transfer to the shift control circuit of Fig. 6. Additionally, an amplifier 148 is so connected that its direct output signal indicates that the character under consideration is not numeric, numeric characters requiring only 4 bits plus a parity bit. The direct output of amplifier 148 is connected to terminal 143 which in turn connects to the shift control circuit of Fig. 6.

Fig. 6 illustrates the shift control circuit which governs the operation of the reversing register and of the punctuation register. Additionally, the shift control circuit exerts a controlling effect upon the punctuator. The $U_4$ and $U_2$ bits of the punctuation codes are received at terminals 161 from the most first output of the punctuation register of Fig. 3. Reference to the code chart above will show that each Punctuation Register Code consists of the bits $U_4$, $U_2$, $U_1$ and $U_p$. As will become more clear from the explanation below, a "stop shift" signal is required in all but two operations, the latter being "do nothing" (digit 0), and "change zero to space" (digit 1). The chart shows both $U_4$ and $U_2$ to be represented by binary Zero's in the above two cases, while in all other operations (digits 2–7), a binary One occurs in one or both of $U_4$ and $U_2$. Accordingly, only the $U_4$ and $U_2$ inputs are required to determine whether or not a "stop shift" signal is required. If data punctuation is to be performed, a "punctuate" signal is applied to terminal 162 for further application to gates 171, as well as to a correspondingly labelled terminal 162 in the punctuator of Fig. 4. Alternatively, if depunctuation is desired, a "depunctuate" signal is applied to gate 172 via terminal 163. It will be understood that data may be transferred between the two domains without punctuating or depunctuating them. For example, it may be desirable to store the output data of the computer in their unpunctuated form in order to conserve space. Such data transfer is evidently carried out without the application of "punctuate" or "depunctuate" signals. Gate 172 additionally receives a pulse from terminal 142 if the character under consideration is a non-space character. Furthermore, a pulse is received via terminal 143 if the character under consideration is non-numeric. The latter two terminals are connected to correspondingly labelled terminals of the depunctuator of Fig. 5. The output signals from gates 171 and 172 are buffered to amplifier 173. The shifting of data in the least first and in the most first direction is accomplished by the application of appropriate signals to terminals 164 and 165. The latter terminal is additionally connected to the second domain receiving unit to supply a signal which controls the entry of data into the second domain. The inverted output signal of amplifier 173, which consists of a One pulse as lone as both $U_4$ and $U_2$ are Zero, i.e. as long as shifting is required, is fed to gate 174. An appropriately delayed shift most first signal is also fed to gate 174. Accordingly, a pulse will be received by amplifier 175 upon the simultaneous occurrence of pulses in both of the last-mentioned signals. Amplifier 176 receives a delayed shift least first signal. The combination of the output signals of amplifiers 175 and 176 produces shift most first, stop shift, and shift least first signals at terminals 67, 71 and 66 respectively. The latter terminals are connected to correspondingly labelled terminals of the reversing register of Fig. 2. Gate 177 is excited by the inverted output signal of amplifier 173, a delayed shift most first signal and an appropriately delayed "punctuate" signal. Gate 178 is excited by a delayed shift least first signal and a delayed "punctuate" signal. The outputs of these gates are connected to amplifiers 181 and 182 respectively, the output signals of the latter being appropriately combined to produce a shift most first, stop shift, and shift least first signal at terminals 91, 92 and 88 respectively. The latter terminals are connected to correspondingly labelled terminals of the punctuation register of Fig. 3. The input of amplifier 181 is further connected to terminal 166 which in turn is connected to a shift most first signal source. The purpose of the latter source is to shift the punctuation register in the most first direction when the punctuation codes of the punctuation format are entered into the register.

In any transfer of data from the second domain to the first domain, the shift control circuit initially treats the reversing register as the destination. At first the reversing register contains all 0's. The data unit, e.g. the number which enters the register, shifts these out to make room. For example:

|  | Reversing Register |  |
|---|---|---|
| Before | 0000000000000 | 123456+ |
| After | 000000123456+ |  |

The + sign shown above merely indicates the end of the data unit.

When the computer which is located in the first domain receives data, i.e. when data flow in the least first direction is required, the shift control circuit shifts the reversing register in the opposite direction so that the last character put in comes out first, followed by the other digits and finally the 0's from the end of the register. Continuing the example:

|  | Reversing Register |  |
|---|---|---|
| Reversing register empty | 0000000000000 | 123456+ |
| Data shifted in most first | 000000123456+ |  |
| Data shifted out least first | 0000000000000 | 000000123456+ |

In transfers from the first domain to some other location, the shift control circuit puts the sign and the specified number of digits from the least significant end of a computer register into the reversing register, leaving the last character in the left hand position. The shift control circuit then shifts the reversing register in the most first direction until the sign comes out. For example:

|  |  | Reversing Register |
|---|---|---|
| Before | 000000123456+ | 000000000000 |
| Reversing Register Filled |  | 123456+000000 |
| Reversing Register Emptied | 123456+ | 000000000000 |

Note that at the end of every transfer to or from the first domain, the reversing register contains all 0's. The punctuation register, as explained above, is similar to the reversing register, but has further provisions for recirculating the stored punctuation format around the register. Punctuation codes can be transferred to this register. When this is done the previous contents of the register are shifted along far enough to make room for the incoming punctuation codes. Information contained in the punctuation register which is shifted off the end is lost. For example:

|  | Punctuation Register |  |
|---|---|---|
| Before | 5005005005004 | 000 |
| After | 5005005004000 |  |

When the shift control circuit orders the computer in the first domain to put a specified number of digits into the reversing register, it simultaneously causes the punctuation register to recirculate data for the same number of digits. Thus:

|  | Before | After |
|---|---|---|
| Reversing Register | 0000000000000 | 1234567+00000 |
| Punctuation Register | 5005005004000 | 0500400050050 |

It should be noted that no matter how many digits are put into the reversing register, the code that used to be at the right end end of the punctuation register stays aligned with the sign of the data unit in the reversing register. When the reversing register is being emptied, the transfer of data may be interrupted or altered to conform to the particular punctuation code appearing at the left hand end of the punctuation register. For example, in accordance with the punctuation code chart comprising eight possible operations given above, the following steps may occur:

If a 0 or a 1 digit (see first column of chart above) is at the left hand end of the punctuation register, both the reversing register and the punctuation register shift one place. The punctuation register recirculates and the reversing register does not. If the punctuation code is 1, and if the reversing register puts out a 0, that 0 is changed to a space code in the data and is thus transferred. If the punction register code is 0, or if the reversing register puts out a non-0, the reversing register output is transferred unchanged. Thus:

| Punctuation Code | Output of Reversing Register | Result |
|---|---|---|
| 0 | 0 | Transferred unchanged—i.e. 0. |
| 1 | 0' (non-0) | Transferred unchanged—i.e. 0'. |
| 1 | 0 | Space. |
| 1 | 0' (non-0) | Transferred unchanged—i.e. 0'. |

If the punctuation code is 4, 5, 6, or 7, both registers again shift one place. This recirculates the data in the punctuation register while the data in the reversing register are transferred out unchanged. During the next bit period, however, neither register shifts. The punctuation mark called for by the former code in the punctuation register is generated and inserted after the last data character received from the reversing register. During this time the present code at the output of the punctuation register is disregarded, so that in the next bit time both registers must shift.

If the punctuation code is 2 or 3 the process is similar to the combined effects of codes 1 and 6 or 7. Both registers must shift one place and then stand still for one bit time. During the first time the reversing register output is transferred unchanged, unless it is a 0; if the reversing register output is 0, it is changed to the letter oh. In the second bit period the punctuation mark, slash, or space is inserted by the punctuator.

The following examples illustrate the use of the punctuation process (the symbol "o" denoting the letter "oh"

which is a non-suppressible zero and hence will actually look like a zero when finally typed or printed).

|  | Reversing Register | Punctuation Register |
|---|---|---|
| Before | 0000000000000 | 5005005004000 |
| Reversing Register filled | 1234567+00000 | 0500400050050 |
|  1 | 234567+000000 | 5004000500500 |
|  12 | 34567+0000000 | 0040005005005 |
|  12, | 34567+0000000 | 0040005005005 |
|  12,3 | 4567+00000000 | 0400050050050 |
|  12,34 | 567+000000000 | 4000500500500 |
|  12,345 | 67+0000000000 | 0005005005004 |
|  12,345, | 67+0000000000 | 0005005005004 |
|  12,345.6 | 7+00000000000 | 0050050050040 |
|  12,345.67 | +000000000000 | 0500500500400 |
| 12,345.67+ | 0000000000000 | 5005005004000 |
| Before | 0000000000000 | 0050050021600 |
| Reversing Register filled | 10045+0000000 | 0216000050050 |
|  1 | 0045+00000000 | 2160000500500 |
|  1o | 045+000000000 | 1600005005002 |
|  1o/ | 045+000000000 | 1600005005002 |
|  1o/ | 45+0000000000 | 6000050050021 |
|  1o/4 | 5+00000000000 | 0000500500216 |
|  1o/4/ | 5+00000000000 | 0000500500216 |
|  1o/4/5 | +000000000000 | 0005005002160 |
| 1o/4/5+ | 0000000000000 | 0050050021600 |

It is to be noted that if any two of the punctuation codes 2, 3, 4, 5, 6 or 7 are put next to each other in the punctuation register, the marks inserted by the punctuator will appear separated by a digit.

During depunctuation somewhat the reverse of the process described for punctuation occurs. Essentially, the punctuation symbols within the word are suppressed without the creation of spaces between the data characters. As already explained previously, the inverted output signal of amplifier 145 of the depunctuator, shown in Fig. 5, represents a non-space signal. Accordingly, gates 147 remain open upon receipt of such a signal and of the data character in order to pass the data character on. The shift control circuit acts upon the receipt of a non-space or of a non-numeric signal, as will be explained hereinafter. Essentially, depunctuation proceeds as follows:

| Reversing Register |  |
|---|---|
| 0000000000000 | 12,345.67+ |
| 0000000000001 | 2,345.67+ |
| 0000000000012 | ,345.67+ |
| 0000000000012 | 345.67+ |
| 0000000000123 | 45.67+ |
| 0000000001234 | 5.67+ |
| 0000000012345 | .67+ |
| 0000000012345 | 67+ |
| 0000000123456 | 7+ |
| 0000001234567 | + |
| 000001234567+ |  |

If it is desired to read a particular data unit out of the reversing register in the most first direction for transfer in punctuated form to the secnd domain, a shift most first signal is applied ot terminal 165 in the shift control circuit of Fig. 6. Additionally, a "punctuate" signal is applied to terminal 162. Both of gates 171 will remain closed prior to the arrival of a punctuation code other than a 0 (do nothing) code. Similarly, gate 172 remains closed, there being no pulse signal on inputs 142 and 143. Accordingly, since no input pulse is received by amplifier 173, a pulse appears at its inverted output. Gates 177 and 174 then open to pass on signals to amplifiers 181 and 175 respectively. The direct output signals of these amplifiers appear at terminals 91 and 67 respectively, to cause the punctuation and reversing registers to shift in the most first direction. It is assumed that the punctuation code appearing at the output of the punctuation register during this period consists of 0 digits denoting a "do nothing" signal. If now, the punctuation code 5 (insert comma) appears at the output of the punctuation register, pulse signals are supplied to one of gates 171 in accordance with the binary code adopted for the punctuation symbols. Provided an output signal is received from amplifier 181, gates 171 will open to pass a signal to amplifier 173. Since no pulse appears now at the inverted output of the latter, gates 177 and 174 close. The pulses comprising the inverted output signals of amplifiers 181 and 175 are then fed to gates 189 and 188 respectively, and conditionally open the latter. Since no shift pulses are applied to terminal 164 during this period, pulses appear at the inverted output of amplifiers 182 and 176 respectively, causing gates 189 and 188 to open and to supply "stop shift" signals to respective terminals 92 and 71. These signals arrest the transfer of information in both registers and cause the information presently stored therein to circulate in place. Since the second domain receiving unit continues to be actuated by shift pulses received from terminal 165, the data previously derived from the reversing register continues to shift in the most first direction to create a space into which the desired punctuation code, in this case a comma, is then inserted.

As seen from Fig. 6, the direct output of amplifier 181 is connected to the input of gates 171. This connection prevents the locking of the registers in the event that two punctuation codes, both of which involve a "stop shift" signal to the registers, follow each other. At the instant when a code preceding the first of these two punctuation codes appears at the MF end of the punctuation register to be recirculated around the register, the output signals from the shift control circuit are such as to cause the registers to shift most first. One half bit time later the first punctuation code moves to the MF end of the punctuation register providing an input signal at terminals 161. At this time, a pulse appears at the direct output of amplifier 181, which opens gates 171 to permit the aforesaid signal to enter amplifier 173. One half bit time later, while a shift MF signal appears at the output of the shift control circuit, no pulse appears at the inverted output of amplifier 173 to cause gate 177 to close. At the same time, the first punctuation code recirculates around the punctuation register, while the second punctuation code moves to the MF end. One half bit time later, no pulse appears at the output of amplifier 181 and hence gates 171 close ot prevent the punctuation register from entering a signal into the shift control circuit. One half bit time thereafter, the absence of output pulses from the shift control circuit arrests the shifting of both registers, which causes the second punctuation code to remain at the MF end of the punctuation register. After a further one half bit time interval has elapsed, amplifier 181 again receives an input pulse and hence shifting can resume one half bit time thereafter. Simultaneously, gates 171 open again. The second punctuation code is recirculated around the punctuation register when shifting begins again and normal operation is resumed.

It will be seen from the foregoing operation, that the application of an input signal to amplifier 173 causes the inverted output signal of the latter to stop the shifting of both registers. Depunctuation requires the application of a "depunctuate" signal to terminal 163. The appearance of a non-space, non-numeric character opens gate 172 to feed an output signal to amplifier 173. The absence of an inverted output signal from the latter then prevents the shifting of both registers. Since the reversing register is unable to accept any data from the depunctuator without shifting, the particular character or punctuation symbol is suppressed. The only exception occurs in the case of a space. As previously mentioned, this is detected by gate 144 in Fig. 5. The code is then transformed into the code for a 0, in which form it is fed to the reversing register.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. Translating apparatus for converting each data unit which is to be transferred between respective first and second domains of a data processing system into a form acceptable to the addressed domain comprising a first register adapted to receive each data unit addressed to said second domain, said data unit consisting of individual data symbols, a second register adapted to hold a punctuation format corresponding to the particular data unit residing in said first register, said format consisting of individual punctuation codes, control means for selectively coordinating the flow of information in said registers to maintain a fixed relationship between individual punctuation codes and respective data symbols relative to one end of each register, and first means selectively responsive to the appearance of said punctuation codes at said one end of the second register to operate upon said data unit emanating from said one end of the first register in accordance with the instructions provided by said codes.

2. The apparatus of claim 1 and further including second means adapted to receive each data unit addressed to said first domain, said second means being responsive to changes in said data unit due to the operation of said first means to restore said data unit to its original form.

3. The apparatus of claim 2 wherein said first register links said first domain and said second means, said first register being additionally adapted to receive each data unit addressed to said first domain from said second means.

4. The apparatus of claim 3 wherein said control means is responsive to the appearance of said punctuation codes at said one end of said second register, said first means comprising a punctuator, said control means linking said punctuator to enable the latter to carry out the instructions called for by said punctuation codes, said first register further linking said punctuator to condition the operation of the latter upon the data symbols emanating from said one end of the first register.

5. The apparatus of claim 4 wherein said second means comprises a depunctuator, said depunctuator changing selected data symbols provided by said punctuator back to their original form, the operation of said first register being conditioned upon the nature of the data symbols entering said depunctuator by means of a connection linking said control means to said depunctuator.

6. The apparatus of claim 5 and further comprising means for recirculating the punctuation format around the punctuation register, said recirculated format punctuating successive data units of the same class, said last-recited means being selectively adapted to terminate said recirculation in favor of entering a new format into said punctuation register.

7. The apparatus of claim 6 wherein said first register is capable of shifting data in either direction, said first register being selectively operative to transfer the data symbols constituting a data unit to their addressed domain in the opposite order of significance from that in which they were received.

8. The apparatus of claim 7 wherein said punctuation codes exist in a first binary code in said punctuation register, said punctuator converting said punctuation codes into a second binary code acceptable to said second domain.

9. The apparatus of claim 1 wherein said control means is responsive to the appearance of said punctuation codes at said one end of said second register, said first means comprising a punctuator, said control means linking said punctuator to enable the latter to carry out the instructions called for by said punctuation codes, said first register further linking said punctuator to condition the operation of the latter upon the data symbols emanating from said one end of the first register.

10. The apparatus of claim 9 and further comprising means for recirculating the punctuation format around the punctuation register, said recirculated format punctuating successive data units of the same class, said last-recited means being selectively adapted to terminate said recirculation in favor of entering a new format into said register.

11. The apparatus of claim 10 wherein said punctuation codes exist in a first binary code in said punctuation register, said punctuator converting said punctuation codes into a second binary code acceptable to said second domain.

12. The apparatus of claim 11 wherein said first register is capable of shifting data in either direction, said first register being selectively operative to transfer the data symbols constituting a data unit to their addressed domain in the opposite order of significance from that in which they were received.

13. Translating apparatus responsive to a single instruction per data word for selectively converting each data word which is to be transferred between respective first and second domains of a data processing system into a form acceptable to the addressed domain, said first domain containing unpunctuated data words consisting solely of numeric data characters, said second domain containing punctuated data words comprising data characters and punctuation symbols, said translating apparatus comprising a reversible shift register positioned intermediate said respective domains to receive each data word being transferred therebetween, a punctuation register adapted to hold a punctuation format corresponding to the particular data word residing in said reversible shift register, said format consisting of individual punctuation codes, means for recirculating said format around the punctuation register for successive data words of the same class, said last recited means being selectively adapted to terminate said recirculation in favor of entering a new format into the punctuation register, a shift control circuit connected to each of said registers for selectively coordinating the direction and the amount of shift therein, said shift control circuit maintaining a fixed relationship between individual punctuation codes and respective data characters relative to one end of each register, a punctuator for punctuating the data words emanating from said one end of said reversible shift register in accordance with the instructions provided by said punctuation codes appearing at said one end of said punctuation register, said shift control circuit and said punctuator being selectively responsive to the appearance of said punctuation codes through respective connections to said punctuation register, said shift control circuit being connected to said punctuator to control the operation of the latter, the data derived from said one end of said reversible shift register being buffered to the information of said punctuator for further transfer to said second domain.

14. The apparatus of claim 13 wherein said punctuator is connected to said reversible shift register to condition the punctuation operation upon the nature of the data characters emanating from said one end of said shift register.

15. The apparatus of claim 14 and further comprising a depunctuator connected intermediate said second domain and said shift register, said depunctuator changing selected punctuation symbols provided by said punctuator back to their orignal form, said depunctuator being connected to said shift control circuit to selectively control the latter, whereby the operation of said shift-controlled first register is conditioned upon the nature of the information entering the depunctuator from said second domain.

16. The apparatus of claim 15 wherein said shift control circuit selectively governs the operation of said reversible shift register to transfer data words in the opposite order of significance of data characters from that in which they were received.

17. The apparatus of claim 16 wherein each data character in the first domain is represented in a first binary digital code, each punctuation code being represented in a second binary code, said punctuator converting information received by it into a third binary digital code acceptable to said second domain, said depunctuator converting the information received from said second domain back into said first binary digital code prior to passing it on to said reversible shift register.

18. The apparatus of claim 17 wherein each of said registers is provided with a local signal circulation path, said registers being capable of selective actuation by said shift control circuit to arrest the flow of information thereacross by locally circulating respective binary digits contained therein at bit time intervals.

19. Translating apparatus for converting data units which are to be transferred between respective first and second domains of a data processing system into a form consistant with the addressed domain comprising, a first register adapted to receive the data units to be converted, a second register adapted to hold a conversion code format, control means for selectively coordinating the flow of information in said registers to maintain a predetermined positional relationship between said data unit and said conversion code format, and means responsive to the output of said second register to operate upon the data unit appearing at the output of said first register.

References Cited in the file of this patent

UNITED STATES PATENTS

| | | |
|---|---|---|
| 2,604,262 | Phelps | July 22, 1952 |
| 2,702,380 | Brustman | Feb. 16, 1955 |
| 2,721,990 | McNaney | Oct. 25, 1955 |

UNITED STATES PATENT OFFICE

CERTIFICATION OF CORRECTION

Patent No. 2,961,644            November 22, 1960

Charles W. Gardiner

It is hereby certified that error appears in the above numbered patent requiring correction and that the said Letters Patent should read as corrected below.

Column 2, line 26, for "enters" read -- enter --; column 5, line 29, for "an" read -- a --; column 7, line 63, for "terminal" read -- terminals --; column 8, line 58, for "lone" read -- long --; column 10, line 25, for "end", first occurrence, read -- hand --; column 12, line 40, for "ot" read -- to --.

Signed and sealed this 2nd day of May 1961.

(SEAL)
Attest:

ERNEST W. SWIDER
Attesting Officer

DAVID L. LADD
Commissioner of Patents